Oct. 7, 1958 P. D. LEWIS 2,854,747
ORTHODONTIC BRACKET ASSEMBLY
Filed Nov. 18, 1957
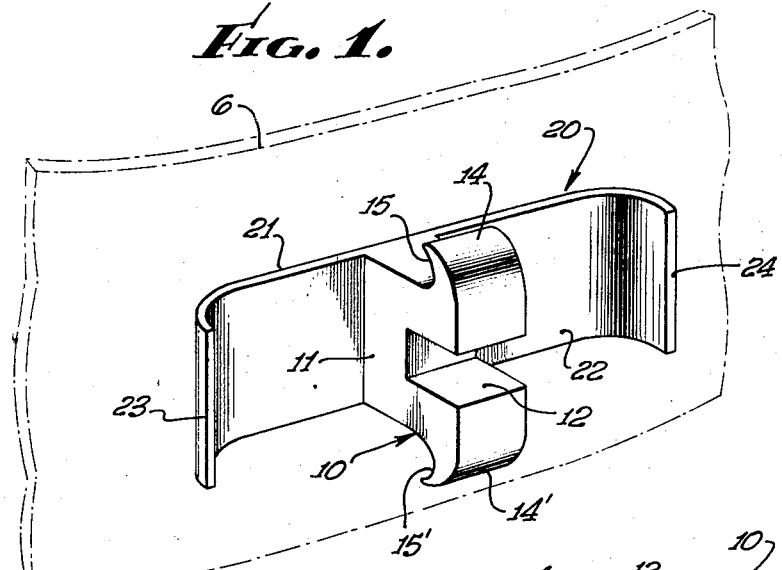
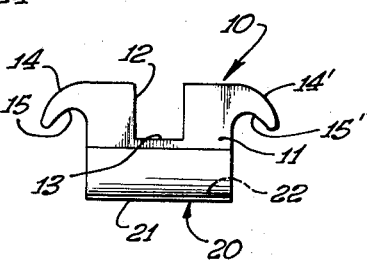
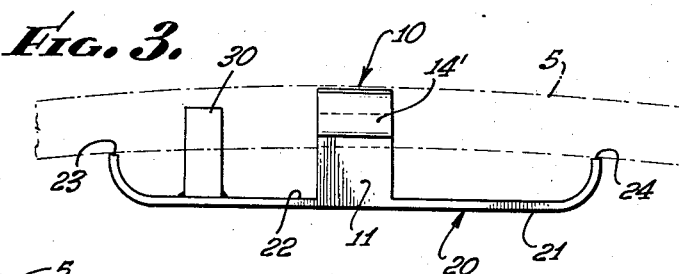
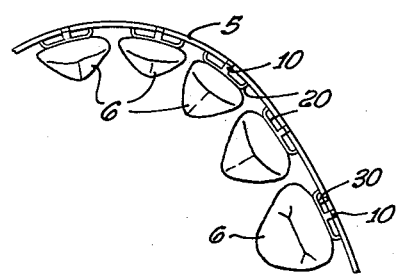
PAUL D. LEWIS,
INVENTOR.
BY
ATTORNEYS.

United States Patent Office 2,854,747
Patented Oct. 7, 1958

2,854,747

ORTHODONTIC BRACKET ASSEMBLY

Paul D. Lewis, Seattle, Wash., assignor to The Wilkinson Company, Santa Monica, Calif., a corporation of California Application November 18, 1957, Serial No. 697,026

3 Claims. (Cl. 32—14)

The present invention relates to an orthodontic bracket assembly adapted to controllably transmit torque and directional force to a tooth. It is particularly characterized by the provision of integral wings which facilitate the use of such brackets in orthodontia.

During the past twenty years orthodontia has been rather extensively used for the correction of facial deformities resulting from mal-occlusion of the teeth. Most cases of overbite, overjet and other imperfect relationship of teeth may be corrected by imparting a controlled bodily movement to the teeth. One of the most useful of the orthodontic appliances used is a small bracket which the orthodontist normally welds or solders to a band which is then caused to firmly embrace a tooth. These various brackets are then interconnected by means of an archwire and by proper manipulation of tension and force transmitted to the brackets by the archwire a desired movement can be imparted to the teeth. A correct mesio distal relationship of teeth and dental arches can be attained by prolonged gradual treatment. However, the brackets are extremely small and necessitate a great deal of time-consuming work by the orthodontist. Moreover, prior brackets were not satisfactory in that the area of the bracket is extremely small and it was difficult to maintain stability. Moreover, it was not possible to readily impart rotation to a tooth or to apply a rectilinear force without causing rotation in the event a direct force was desired without rotation.

The present invention is directed to an orthodontic bracket assembly including a bracket which is integral with a pressure plate provided with longitudinally disposed end portions, these end portions terminating in a plane forward of the pressure plate. When a normal archwire is used in the bracket the archwire can be caused to not only seat in the bracket but also to contact the longitudinally spaced end portions of the pressure transmitting plate. A positive directional force can thus be transmitted to a tooth since the archwire may contact the bracket assembly at three spaced points. Rotational force may also be imparted to a tooth by causing the archwire to contact but one of the terminal portions of the pressure transmitting plate and the bracket. By the provision of the assembly, hereinafter described in greater detail, an orthodontist is provided with a tool or appliance which greatly facilitates his work and insures more controllable application of forces.

An object of the present invention therefore is to disclose and provide an orthodontic bracket assembly adapted to controllably transmit torque and directional force to a tooth, as desired by the orthodontist.

A further object of the invention is to disclose and provide an orthodontic bracket assembly provided with means whereby stability is obtained by the use of longitudinally spaced points of contact.

A further object of the invention is to disclose and provide an integral bracket assembly including a bracket and integral pressure plate, such pressure plate terminating in end portions which are spaced from the bracket longitudinally and spaced from the pressure plate face so as to permit proper positioning of archwire, a controllable and amplified transmission of pressure or torque as desired and in addition providing an area wherein anti-tipping spurs may be carried by the pressure plate for the purpose of preventing undesirable tipping of the teeth.

These and various other objects and advantages of the invention will become more apparent to those skilled in the art from the exemplary forms of the invention shown in the appended drawings wherein:

Fig. 1 is a perspective view of the bracket assembly of the present invention (shown in full lines) in relation to a tooth embracing band (shown in dash lines);

Fig. 2 is an end view of the bracket assembly illustrated in Fig. 1.

Fig. 3 is a side view of a bracket assembly provided with an anti-tip spur, an archwire being indicated in dash lines.

Fig. 4 is a plan view of a portion of a dental arch illustrating the central incisors, a lateral incisor, a cuspid, and a first bicuspid, the teeth being subjected to orthodontic treatment with bracket assemblies of the character herein disclosed.

The bracket assembly comprises a bracket 10 and an integral pressure plate 20. The pressure plate 20 is provided with a rear pressure transmitting face 21 and a forward face 22. Longitudinally disposed end portions of the pressure plate 20 terminate in end portions 23 and 24 which lie in a plane parallel to the front face 22, but spaced forwardly thereof.

The bracket 10 is integral with the pressure plate 20 and is located in the medial portion of the pressure plate. The bracket comprises a shank 11 which extends forwardly beyond the plane including the end portions 23 and 24 of the pressure plate. The bracket 10 also is provided with a slot 12 adapted to receive an archwire, this slot being in the end of the shank 11 and having a bottom 13 which is preferably, although not necessarily, in a plane spaced slightly further from the front face 22 of the pressure plate than the ends or terminals 23 and 24 of such pressure plate.

The end of the shank 11 of the bracket 10 is also provided with a pair of transversely extending, oppositely directed, extensions such as 14 and 14', each being provided with a rearwardly curved outer surface and a rearwardly facing longitudinally extending recess such as 15 and 15', these recesses being adapted to accommodate ligatures, wires, and clamps often employed by an orthodontist in holding or positioning an archwire extending through the slot 12 with relation to the bracket assembly.

It is to be understood that the entire bracket assembly is minute in size. The slot 12 need only accommodate the normally used archwire which may range from round wire having a diameter of from about 0.016 to 0.020 inch or a rectangular archwire which may vary from about 0..021 to 0.022 in one dimension and is generally 0.028 in the other dimension, cross-sectionally. The total height of the bracket from the rear face of the pressure plate to the front face 14 may be on the order of about 0.05 inch. The total length of the bracket assembly, that is the distance between the terminal portions 23 and 24 may vary from about 0.18 to 0.25 inch. The exposed front face 22 of the pressure plate 20 between a terminal such as 23 and the side of the bracket 10 is preferably greater than the width of the bracket 10 and in actual practice distances of between 0.07 and 0.1 inch are employed so as to provide an area or space on either side of the bracket in which anti-tipping spurs may be connected.

Fig. 3 illustrates a bracket assembly of the present invention including a tipping spur 30 which may be made from a section of archwire, such tipping spur being welded or brazed to the front face 22 of the pressure plate 20 in the space between the bracket and the upstanding end portion or terminal 23. Ordinarily these anti-tipping spurs 30 are brazed or welded adjacent one longitudinal edge of the pressure plate so as to permit the archwire indicated in dash lines and bearing the numeral 5 to pass to one side of the spur 30, such spur resting against the side of the archwire so as to prevent rotation of the entire bracket assembly about an axis perpendicular to the pressure plate 20. The ends of the spurs are preferably flush with the outer surface of the archwire; a spur may be positioned on either or both sides of shank 11.

In actual practice, the bracket assemblies described hereinabove are attached by welding or brazing to a band such as 6 (illustrated in dash lines in Fig. 1) this ban being of a suitable contour to permit its being bent, wrapped, and tightened about a tooth, thereby positioning the bracket in accordance with the desire of the orthodontist and the purpose to be attained. In the event a direct force is to be applied to the tooth, the archwire 5 (Fig. 3) may contact both of the upstanding terminals 23 and 24 of the pressure plate as well as the bottom 13 of the slot 12 in the bracket, thereby imparting great stability to the arrangement and applying a directional force through the pressure plate over a relatively wide area. In many instances, however, the bracket assembly is so positioned on the tooth embracing band 6 that the force is transmitted from the archwire to the tooth through the pressure plate 20 only by reason of contact between the archwire and the assembly at one of the terminal end portions and the bracket. A desired rotational effect can thereby be obtained, or in many instances a desired distal movement is obtained and the mesio distal relationship of the teeth is properly corrected.

Fig. 4 is a diagrammatic representation illustrating somewhat imperfectly the relative positions of the archwire 5 to the various bracket assemblies carried by the teeth. It will be noted that one of the bracket assemblies is provided with an anti-tip spur 30. Clamps and ligatures are not illustrated and Fig. 4 is not intended to be a guide to orthodontists.

Bracket assemblies of the character described herein are preferably made from precious metal alloys having a desired hardness and some resiliency. Alloys of gold, platinum, palladium, iridium, silver, and copper are well adapted for use in the manufacture of these bracket assemblies, gold being the predominating metal. In some instances chromium alloys can be employed to good advantage. It may also be stated that these minute bracket assemblies can be made by forming wire (of the desired alloy) into a cross-sectional shape approximating that of the shank of the bracket and then by milling and cutting operations and forming operations the entire assembly may be made from such lengths of wire. By the use of wire, some advantages are obtained from the fact that crystal grain runs longitudinally of the wire in most instances and is therefore longitudinal with respect to the pressure plate 20, imparting greater strength and better qualities to the pressure plate and its pressure receiving terminals 23 and 24.

Those skilled in this art will recognize that the assembly hereinabove described permits an orthodontist to utilize the bracket in numerous ways for the controlled selective application of either torque or directional force to a tooth. Many time-consuming operations previously conducted by orthodontists are eliminated by the use of the assembly.

I claim:

1. An orthodontic bracket assembly adapted to controllably transmit torque and directional force to a tooth comprising: a virtually resilient, rigid, narrow and thin pressure plate provided with a rear pressure-transmitting face and a front face, said pressure plate being provided with longitudinally disposed end portions terminating in a plane parallel to said front face but spaced forwardly thereof; a bracket integral with the pressure plate in the medial portion thereof, said bracket having a shank extending forwardly beyond a plane including the end portions of the pressure plate; a slot adapted to receive an archwire in the end of the shank; and a pair of transversely extending, oppositely directed extensions adapted to accommodate ligatures and clamps.

2. A bracket assembly as stated in claim 1, wherein the bottom of said slot is at a slightly greater distance from the front face than the terminals of said end portions.

3. A bracket assembly as stated in claim 1, including a tipping spur carried by said front face between the bracket and an end portion of the pressure plate.

References Cited in the file of this patent

UNITED STATES PATENTS 2,527,526     Brusse _____ Oct. 31, 1950